United States Patent
Voith et al.

(10) Patent No.: US 7,970,014 B2
(45) Date of Patent: Jun. 28, 2011

(54) METHOD OF PROVIDING A REAL-TIME COMMUNICATION CONNECTION

(75) Inventors: Thomas Voith, Kornwestheim (DE); Joachim Riemer, Stuttgart (DE)

(73) Assignee: Alcatel Lucent, Paris (FR)

(*) Notice: Subject to any disclaimer, the term of this patent is extended or adjusted under 35 U.S.C. 154(b) by 1433 days.

(21) Appl. No.: 11/412,748

(22) Filed: Apr. 28, 2006

(65) Prior Publication Data

US 2007/0206579 A1    Sep. 6, 2007

(30) Foreign Application Priority Data

May 17, 2005    (EP) ..................................... 05291065

(51) Int. Cl.
*H04J 3/24* (2006.01)

(52) U.S. Cl. ......... 370/473; 370/356; 370/465; 370/471

(58) Field of Classification Search .................. 709/238, 709/213; 370/539, 474, 473, 356, 465, 471
See application file for complete search history.

(56) References Cited

U.S. PATENT DOCUMENTS

| | | | |
|---|---|---|---|
| 6,657,997 B1 * | 12/2003 | Lide et al. | |
| 7,551,644 B1 * | 6/2009 | Mohaban et al. | 370/473 |
| 2002/0150092 A1 * | 10/2002 | Bontempi et al. | |
| 2003/0223381 A1 * | 12/2003 | Schroderus | |
| 2004/0172464 A1 * | 9/2004 | Nag | |
| 2006/0174032 A1 * | 8/2006 | Winchester et al. | 709/238 |

OTHER PUBLICATIONS

Argyriou A. et al.: "Streaming H.264/AVC video over the internet" Consumer Communications and Networking Conference, 2004. CCNC 2004. First IEEE Las Vegas, NV, USA, Jan. 5-8, 2004, Piscataway, NJ, USA, IEEE, Jan. 5, 2004, pp. 169-174, XP010696819.*
MMUSIC WG H Schulzrinne Columbia U A Rao Cisco R Lanphier Realnetworkds M Westerlund Ericsson A Narasimhan Overture: "Real Time Streaming Protocol (RTSP)" IETF Standard-Working-Draft, Internet Engineering Task Force, IETF, CH, vol. mmusic, No. 9, Feb. 21, 2005, XP015038639.*

* cited by examiner

*Primary Examiner* — Simon Sing
*Assistant Examiner* — Simon King
(74) *Attorney, Agent, or Firm* — Harness, Dickey & Pierce, PLC

(57) ABSTRACT

The invention concerns a method of providing a real-time communication connection over an IP communication network between a first entity and a second entity, as well as a sending and a receiving device to execute the method. The basic idea of the invention is to fragment non-real-time streams associated with the real-time communication connection at the first entity, to multiplex the fragments of the non-real-time streams into real-time streams of the real-time communication connection at the first entity, and to transmit the multiplexed real-time streams comprising the real-time streams and the fragments of the non-real-time streams via the real-time communication connection from the first entity to the second entity. In order to ensure a reliable quality of service of the real-time data, the real-time part of the multiplexed data stream is assigned the highest priority for transmission. At the second entity, the multiplexed real-time streams are demultiplexed, the fragments of the non-real-time streams are re-composed and the original non-real-time streams are re-generated.

10 Claims, 6 Drawing Sheets

METHOD OF PROVIDING A REAL-TIME COMMUNICATION CONNECTION

The invention is based on a priority application EP 05291065.0 which is hereby incorporated by reference.

FIELD OF THE INVENTION

The invention relates to a method of providing a real-time communication connection using the Internet Protocol (=IP), and to a sending and a receiving device for executing said method.

BACKGROUND OF THE INVENTION

Request for Comments (=RFC) document 1889 describes the RTP protocol and the RTCP protocol (RTP=Real-Time Transport Protocol; RTCP=Real-Time Transport Control Protocol). RTP provides end-to-end network transport functions suitable for applications transmitting real-time data, such as audio, video or simulation data, over multicast or unicast network services.

Transmission over and within packet-switched networks is characterised by a strongly varying, sometimes very intense, i.e., bursty, data traffic. Therefore, real-time transmissions using IP are prone to face several problems, especially in the case of bandwidth limited home equipment and access equipment. The bursty nature of signalling and control traffic impacts the real-time traffic, only partly diminished by the existing simple multiplexing mechanisms. The signalling information needs not be real-time but a minimum transfer guarantee is required to ensure connectivity with the signalling entity on the remote side.

The bursty nature of signalling does not allow to treat the signalling with the same priority as the real-time streams. On the other side, the treatment of signalling with lower priority may lead to disruption in signalling connectivity. For limited access bandwidth it could occur that, e.g., an existing prioritized real-time connection inhibits the signalling traffic for releasing the call.

Firewalls using NAT/NAPT used in home environment make it difficult for end-to-end signalling protocols like, e.g., SIP, to bind the correct media related streams together (NAT=Network Address Translation; NAPT=Network Address Port Translation; SIP=Session Initiation Protocol). A general solution working with all kinds of such NAT/NAPT devices does not exist. Moreover, SIP contains also transport addresses which need to be corrected when a firewall traversal has occurred. RTP termination occurs usually on a different system than the SIP treatment. So, additional control extensions are needed to transmit the information needed to modify the SIP messages. Moreover, a user is forced to open many ports for VoIP if he uses a firewall using NAT/NAPT (VoIP=Voice over Internet Protocol).

SHORT DESCRIPTION OF THE INVENTION

It is the object of the present invention to improve the provision of a real-time communication connection over an IP communication network.

The object of the present invention is achieved by a method of providing a real-time communication connection over an IP communication network between a first entity and a second entity, whereby the method comprises the steps of fragmenting signalling traffic and/or control traffic and/or other non-real-time traffic associated with the real-time communication connection at the first entity; multiplexing the fragments of the signalling traffic and/or control traffic and/or other non-real-time traffic into a real-time traffic stream of the communication connection and generating a resulting data stream comprising the packets of the real-time traffic stream multiplexed with the fragments of the signalling traffic and/or control traffic and/or other non-real-time traffic at the first entity; transmitting said data stream via an IP-based real-time communication connection from the first entity to the second entity wherein the packets of the real-time traffic stream are assigned the absolute priority of transmission, and packets of the signalling traffic and/or control traffic are transmitted in fragments using the available space for their transmission without narrowing the bandwidth available for the packets of the real-time traffic stream; demultiplexing said data stream and obtaining the fragments of the signalling traffic and/or control traffic and/or other non-real-time traffic and the real-time traffic stream of the communication connection at the second entity; re-composing the fragments of the signalling traffic and/or control traffic and/or other non-real-time traffic and generating the original signalling traffic and/or control traffic and/or other non-real-time traffic at the second entity. The object of the present invention is further achieved by a sending device for providing a real-time communication connection over an IP communication network to another entity, whereby the device comprises a control unit adapted for fragmenting signalling traffic and/or control traffic and/or other non-real-time traffic associated with the real-time communication connection; multiplexing the fragments of the signalling traffic and/or control traffic and/or other non-real-time traffic into a real-time traffic stream of the communication connection and generating a resulting data stream comprising the packets of the real-time traffic stream multiplexed with the fragments of the signalling traffic and/or control traffic and/or other non-real-time traffic; sending said data stream via an IP-based real-time communication connection to the other entity wherein the packets of the real-time traffic stream are assigned the absolute priority of transmission, and packets of the signalling traffic and/or control traffic are transmitted in fragments using the available space for their transmission without narrowing the bandwidth available for the packets of the real-time traffic stream. The object of the present invention is further achieved by a receiving device for providing a real-time communication connection over an IP communication network to another entity, whereby the device comprises a control unit adapted for receiving a data stream via an IP-based real-time communication connection from the other entity, the data stream comprising packets of a real-time traffic stream multiplexed with fragments of a signalling traffic and/or a control traffic and/or other non-real-time traffic associated with the real-time communication connection at the other entity wherein the packets of the real-time traffic stream are assigned the absolute priority of transmission, and packets of the signalling traffic and/or control traffic are transmitted in fragments using the available space for their transmission without narrowing the bandwidth available for the packets of the real-time traffic stream; demultiplexing said data stream and obtaining the fragments of the signalling traffic and/or control traffic and/or other non-real-time traffic and the real-time traffic stream of the communication connection; re-composing the fragments of the signalling traffic and/or control traffic and/or other non-real-time traffic and generating the original signalling traffic and/or control traffic and/or other non-real-time traffic.

The term multiplexing, also known as MUXing, refers to the combination of two or more information channels onto a common transmission medium. The term interleaving denotes a special type of multiplexing which involves the re-sorting and the nesting of bits. Interleaving is a way to arrange data in a noncontiguous way to increase performance. Therefore, when the term multiplexing is used in this description, it is meant to also comprise the process of interleaving.

The idea of the invention is to multiplex non-realtime data (SIP, RTCP, etc.) associated with a communication connection onto a realtime stream (RTP, etc.) of the communication connection in a way so that a certain bandwidth limit is never exceeded by the resulting multiplexed stream, i.e., the whole data stream keeps the characteristics of a pure RTP datastream.

The RTP packets usually have an isochronous character, i.e., the RTP packets are transmitted in—to a large extent—constant intervals in time. The non-realtime data is fragmented and—conforming to these constant temporal intervals—multiplexed into the realtime stream such that the pre-defined bandwidth is not exceeded.

For RTP streams not having an isochronous character, non-realtime data is fragmented and—conforming to the character of the RTP stream—multiplexed into the realtime stream such that the pre-defined bandwidth is not exceeded and the transmission of the non-realtime data is adapted to the character of the realtime data.

When transmitting the multiplexed data stream, packets of the realtime traffic are assigned the absolute priority of transmission, and packets of the signalling and/or control traffic, i.e., the non-realtime traffic, are transmitted in fragments using the available space for their transmission without narrowing the bandwidth available for the packets of the realtime traffic stream.

The bandwidth limit applied to the multiplexed stream results from a bandwidth allocated to the realtime stream plus an additional "piggyback" bandwidth reserved for the non-realtime stream and required to maintain a minimum connectivity. The fragmentation of the non-realtime data is executed on a byte level to create non-realtime fragments tailored to fill out the bandwidth not used by the realtime data stream. The fragments of the non-realtime stream are not allowed to narrow the bandwidth reserved for the packets of the realtime stream. In addition, a resulting packet comprising a realtime packet and a non-realtime fragment never exceeds a specific packet size confined by the bandwidth limit. Because of this, transmission bursts can be avoided.

As the packets of the realtime traffic are assigned the absolute priority of transmission, it is only in intervals when no realtime packets are transmitted that the non-realtime stream is allowed to use also the bandwidth normally reserved for the realtime stream. In that case, the non-realtime stream may fill up the entire bandwidth up to the bandwidth limit, again in conformity with the character of the RTP stream, isochronous or non-isochronous. Thus, the transmission of non-realtime data is adapted to the character of the realtime data.

By multiplexing the non-real-time stream on the real-time stream, the non-real-time stream is granted a minimum bandwidth; thus the connectivity of signalling is guaranteed also in very bandwidth-limited links. The multiplexing/interleaving according to the invention saves bandwidth, especially for access equipment. Furthermore, due to the limited bandwidth allocated to the signalling/control traffic, no bursty control traffic or signalling traffic will occur with respect to the media session.

The invention permits an easy NAT/NAPT traversal which works with all kinds of firewalls. Moreover, since all traffic is reduced to the real-time channel, only one pin-hole needs to be opened on the firewall. The continuous RTP traffic keeps the firewall open, and thus also for the non-real-time traffic, i.e., the signalling and the control traffic. In addition, a keep-alive mechanism can easily be added.

Furthermore, the invention makes it possible that a complete media session can be easily forwarded to a new access point via simple IP forwarding. The mechanism according to the invention is open for additional features such as network-provided answering features, announcements, etc. For example, audio announcements can be played to a user when he picks up the phone.

The invention provides a very good approach for implementing a simple IP black phone. It is sufficient to program the IP address of the access point, as can be done by each normal phone keypad. Then an easy set-up via a light-weight protocol could be implemented to get a very dumb terminal.

According to the invention, traffic management is very easy to do for common real-time traffic and all non-real-time traffic in sum. All traffic—real-time and non-real-time—can be encrypted together and not each separately. And, the interleaving mechanism according to the invention is applicable to any kind and number of non-real-time signalling protocol to be interleaved with real-time streams.

Further advantages are achieved by the embodiments of the invention indicated by the dependent claims.

Any delays in real-time data transmission lead to a significant cutback with regard to the audio/video quality at the recipient's site. Therefore, according to a preferred embodiment of the invention, the real-time stream packets are assigned the highest priority for transmission over the real-time connection. Thus it is made sure that—in case of a bottleneck situation—the real-time data are always transmitted with highest priority, and the signalling and control data, which are less critical for the transmission quality, share the remaining bandwidth for transmission. Accordingly, the multiplexing process is adapted to assign the highest priority for transmission to the real-time stream packets. In case of only very small remaining bandwidth—not allowing the parallel transmission of several non-real-time streams—it may happen that just fragments of only one of the non-real-time streams could be transmitted related to one real-time packet.

The non-real-time information such as signalling and control traffic can be inserted into free, unused space of the data packets of the real-time traffic. It is also possible that the non-real-time information and the real-time data are extracted from their original data packets and packed into new data packets, possibly under a different protocol. Further, it is also possible that the non-real-time data are transmitted in different data packets than the real-time data, i.e., that the signalling traffic and/or control traffic and the real-time traffic use separate data packets for transmission. According to a further embodiment of the invention, the signalling and control messages are multiplexed/interleaved with the real-time data using any common and suitable transmission protocol. Preferred protocols for the transmission of the multiplexed stream are RTP, UDP, UDP lite, IP.

According to a preferred embodiment of the invention, the fragments of the signalling and/or control traffic are multiplexed into the real-time traffic stream of the communication connection by generating separate data stream packets for the signalling and/or control traffic and the real-time traffic, whereby each data stream packet comprises an IP header, a UDP header, information about the type of the payload, namely signalling traffic, control traffic, or real-time traffic, a stream ID, a sequence number, information about the length of the payload, and the payload of the signalling traffic or control traffic or real-time traffic.

According to another preferred embodiment of the invention, the fragments of the signalling traffic and/or control traffic are multiplexed into the real-time traffic stream of the communication connection by generating separate data stream packets for the signalling and/or control traffic, and the real-time traffic, whereby each data stream packet comprises an IP header, a UDP header, and a RTP header, and whereby the data stream packets for the signalling traffic and/or control traffic comprise a RTP header extension with an additional UDP pseudo header and with the payload of the signalling traffic or the control traffic.

It is also possible that the fragments of the signalling traffic and/or control traffic are multiplexed into the real-time traffic stream of the communication connection by generating separate data stream packets for the signalling and/or control traffic, and the real-time traffic, whereby each data stream packet comprises an IP header, a UDP header, and a RTP header, and whereby the data stream packets for the signalling traffic and/or control traffic comprise a RTP header extension with additional framing information and with the payload of the signalling traffic or the control traffic. The additional framing information may comprise information such as a segment number, a total number of segments, and a checksum.

It is further possible that the fragments of the signalling traffic and/or control traffic are multiplexed into the real-time traffic stream of the communication connection by generating separate data stream packets for the signalling and/or control traffic, and the real-time traffic, whereby each data stream packet comprises an IP header with a new Internet Protocol number, and whereby the data stream packet for the signalling traffic and/or control traffic comprises an additional UDP pseudo header with the payload of the signalling traffic or control traffic, and the data stream packet for the real-time traffic comprises an additional RTP and UDP pseudo header with the payload of the real-time traffic.

But it is also possible that according to another preferred embodiment of the invention the fragments of the signalling traffic and/or control traffic are multiplexed into the real-time traffic stream of the communication connection by generating a data stream packet comprising an IP header, a UDP lite header, and a RTP header. Then the signalling traffic or the control traffic together with additional framing information comprising a segment number, a total number of segments, and a checksum, are inserted into the additional payload section of the UDP lite packet.

Preferably, the fragments of the signalling traffic and/or control traffic are multiplexed into the real-time traffic stream of the communication connection by generating a data stream packet comprising an IP header, a UDP header, and a RTP header according to redundant RTP. Then the signalling traffic or the control traffic together with a UDP pseudo header are inserted into the redundant section of the redundant RTP packet.

BRIEF DESCRIPTION OF THE DRAWINGS

These as well as further features and advantages of the invention will be better appreciated by reading the following detailed description of presently preferred exemplary embodiments taken in conjunction with accompanying drawings of which.

DETAILED DESCRIPTION OF THE INVENTION

Figure 1:
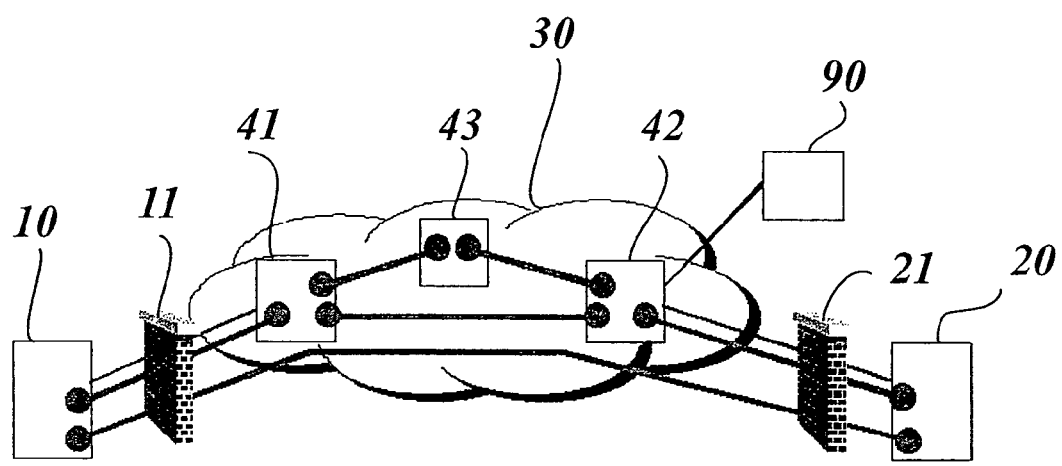
FIG. 1 is a schematic block diagram of a telecommunication system utilising the method according to a first embodiment of the invention.

FIG. 1 shows a transmission system comprising terminals 10, 20, 90 connected to a transmission medium 30 with network nodes 41, 42, 43, and firewalls 11, 21.

It is possible that the transmission system is a telecommunication system with a packet-switched network 30. The packet-switched network 30 may be the public Internet or another packet-switched communication network based on an IP protocol. The packet-switched network 30 may also be composed of various physical sub-networks like, e.g., Ethernet, ATM networks and wireless access networks (e.g., WLAN) interlinked via a common layer three IP communication layer (ATM=Asynchronous Transfer Mode; WLAN=Wireless Local Area Network).

A first telecommunication terminal 10 assigned to a calling party and a second telecommunication terminal 20 assigned to a called party are connected to the packet-switched network 30 and can be used to initiate and receive VoIP telecommunication calls via the packet-switched network 30. The telecommunication terminals 10, 20 may be a VoIP hardphone or a VoIP softphone, e.g., a VoIP telephone set or a PC, equipped with microphone, speakers, and a sound card, operating as softphone due to a dedicated VoIP telephony software.

The invention is not restricted to an end-to-end scenario. It may be used also between a terminal 10, 20 and a network node 41, 42 or between the network nodes 41, 42, 43. And it allows also communication with a terminal 90 not following this invention. In the following text only the terminal to terminal case is described as a representation of all other possible scenarios.

Each of the connections connecting the first telecommunication terminal 10 and the second telecommunication terminal 20 with the packet-switched network 30 may comprise a firewall application or firewall hardware 11, 21 to permit or deny certain applications to and from the telecommunication terminals 10, 20.

A user of the first telecommunication terminal 10 wishes to make a VoIP call to a user of the second telecommunication terminal 20. To initiate the VoIP call, the first telecommunication terminal 10 is adapted to send signalling data such as SIP packets, over the packet-switched network 30 to the second telecommunication terminal 20. After establishing a VoIP connection between the first telecommunication terminal 10 and the second telecommunication terminal 20, the user of the first telecommunication terminal 10 may speak with the user of the second telecommunication terminal 20. Thus, speech data is transmitted, e.g., as RTP packets from the first telecommunication terminal 10 to the second telecommunication terminal 20.

In the real-time VoIP connection of the present example, the transmission of the real-time traffic packets carrying the voice data is required to be without any significant delay since any delay leads to an unwanted deterioration of the voice quality at the second, the receiving telecommunication terminal 20. For live voice conversations, latency of the real-time traffic packets greater than 200 ms is noticeable by humans. The reliable and continuous transmission of the real-time data packets is provided by help of control traffic associated with the real-time traffic. In case the real-time traffic is transmitted using RTP, the control traffic may be realised using RTCP (=RealTime Control Protocol). The RTCP traffic negotiates and assures the observance of Quality of Service (=QoS) parameters through the periodic exchange of control messages among the sender and the receiver.

Thus, the VoIP communication connection between the first telecommunication terminal 10 and the second telecommunication terminal 20 requires the transmission of both real-time data, i.e., voice traffic and non-real-time signalling and control traffic associated to the real-time data.

It is possible that the multiplexed data stream comprising the real-time data and the non-real-time data of the connection is transmitted through a NAT/NAPT unit such as the firewall implementation/device 11, 21 shown in FIG. 1. The method according to the invention facilitates the NAT/NAPT traversal of non-real-time data packets because the real-time data packets may "open" the door (for the used UDP-port only) of a firewall unit for the non-real-time data packets.

It is further possible that a keep-open mechanism is added to the method, possibly with an extension, to keep a firewall door open.

The method according to the invention may be used for the management and control of an integrated feature enriched IP telephone. But it is also possible that the transmission of the non-real-time data packets in combination with the real-time data packets is used for the management and control of network implemented features for a dumb IP telephone. For example, audio announcements can be played to a user when he picks up the phone.

Figure 2:
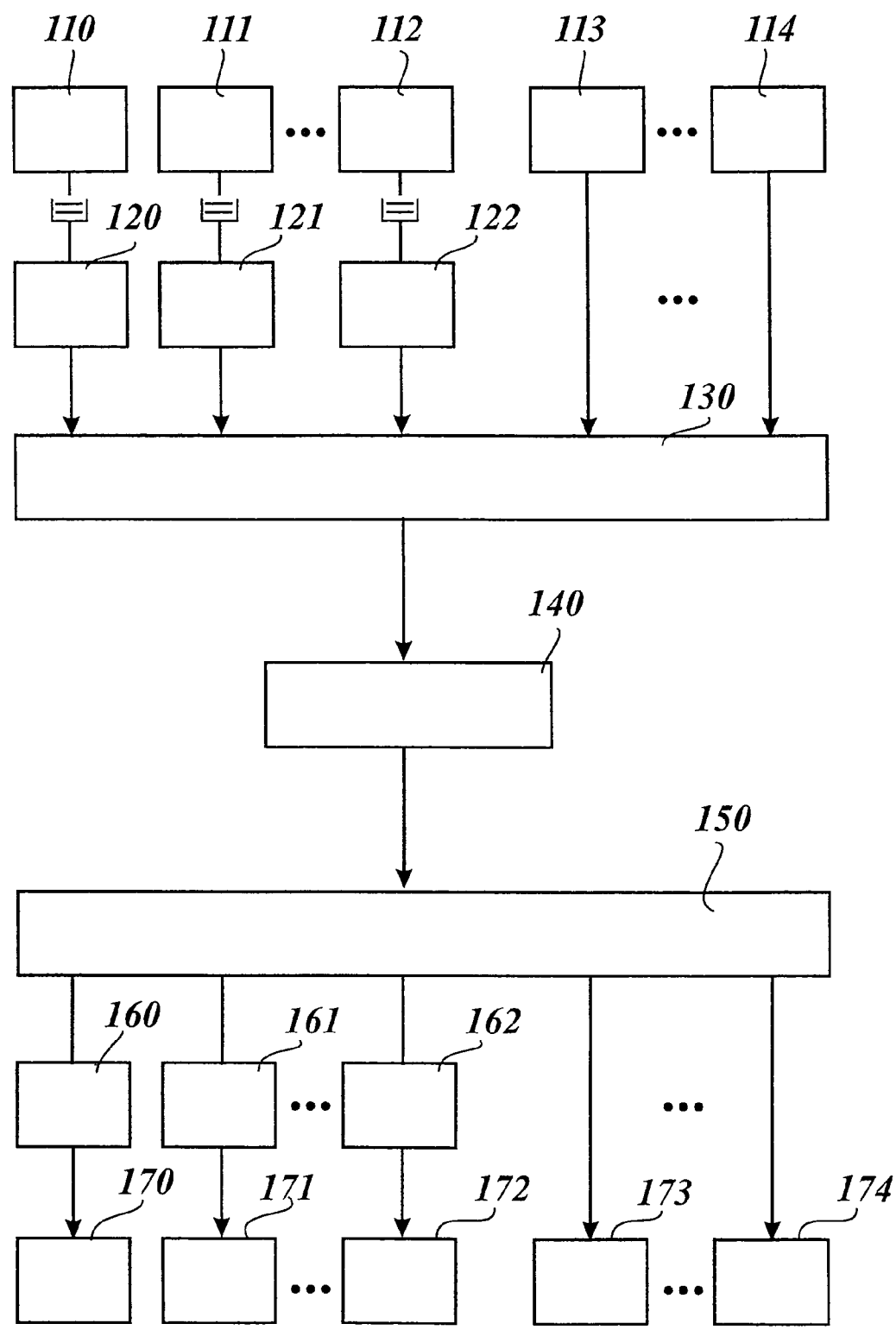
FIG. 2 is a flow chart of the method according to a first embodiment of the invention.

FIG. 2 shows a flow chart describing the operational steps which are carried out to execute the method according to a first embodiment of the invention in the telecommunication system of FIG. 1. Non-real-time streams such as signalling traffic streams 110, control traffic streams 111, and other non-real-time traffic streams 112 are to be transmitted via the packet-switched network 30 from the first telecommunication terminal 10 to the second telecommunication terminal 20. The signalling traffic streams 110 may consist of, e.g., SIP streams, the control traffic streams 111 may be, e.g., RTCP streams, and the other non-real-time traffic streams 112 may be, e.g., SNMP or H.248 streams (SNMP=Simple Network Management Protocol).

The non-real-time streams are associated to one or more real-time traffic streams 113, 114 comprising real-time data like, e.g., VoIP speech data packets or video conferencing speech/video data packets, which are highly sensitive to transmission delays. Several transmission protocols such as UDP or RTP are appropriate for sending the real-time data packets (UDP=User Datagram Protocol).

The invention applies to all kinds of possible stacks. Therefore, the stacks specified in the description only serve as a representation of all possible real-time and non-real-time protocol types of a communication connection.

The payload of the signalling and control traffic packets may be of very different size depending on the current quantity of traffic needed for signalling and controlling. On the other hand, the continuously transmitted real-time data packets do not exhibit the same bursty nature as the signalling and control traffic.

In steps 120, 121, 122, the non-real-time SIP data packets 110, the non-real-time RTCP data packets 111, and the non-real-time SNMP data packets 112 are broken up into smaller fragments. Each of the SIP, RTCP, and SNMP fragments is supplied with information about its content and with additional framing information like, e.g., the total number of fragments an original SIP/RTCP/SNMP packet has been broken into, a segment number defining the position of the current fragment with respect to the other fragments, and a checksum.

It is possible that each of the SIP/RTCP/SNMP fragments is supplied with a header, a trailer and other required packet constituents, such that an independent new data packet is generated which can be sent independently over the real-time connection. But it is also possible that each of the SIP/RTCP/SNMP fragments is integrated into an existing RTP packet, e.g., by appending the SIP/RTCP/SNMP payload into an additionally inserted header extension or by inserting the SIP/RTCP/SNMP payload into payload space of the RTP packet actually assigned to RTP data but not used up. These and other embodiments will be discussed in detail in the description given below.

The fragments are queued up and interleaved and/or multiplexed in the multiplexing step 130 with the one or more RTP streams 113, 114. In step 140, the multiplexed streams are transmitted from the first telecommunication terminal 10 via one or more real-time connections assigned to the RTP packets to the second telecommunication terminal 20.

In case a signalling association controls several RTP streams, the signalling or control traffic may be assigned to exclusive one or diverted among several RTP streams.

In the case of a firewall installed on the connection, the continuous RTP traffic keeps the firewall open also for the non-real-time traffic, i.e., the signalling, control and other non-real-time traffic, multiplexed on the RTP traffic. At the second telecommunication terminal 20, the multiplexed streams are de-multiplexed in step 150, and the signalling and control fragments are put on a queue for defragmenting.

For example, it is possible that the independent SIP/RTCP/SNMP data packets are put into the right order, i.e., according to their segment number, the data framing information only required for the transmission is stripped from the SIP/RTCP/SNMP payload, and the SIP/RTCP/SNMP data is stringed together one after the other to reconstruct the original data packet. It is also possible that the SIP/RTCP/SNMP data contained within RTP packets is extracted from the incoming RTP data packets and used for reconstructing the original data packet.

The process of de-fragmenting and re-composing of the SIP/RTCP/SNMP fragments is shown in FIG. 2 as steps 160, 161, and 162. As a result, the original SIP/RTCP/SNMP data packets 170, 171, 172 are recovered. From the de-multiplexing step 150, the real-time RTP data packets 173, 174 have been retrieved, without the need for re-composing.

Some advantages may be achieved if additional identification (=ID) and/or reference information of the non-real-time data streams are transmitted via the multiplexed real-time data streams.

Figure 3:
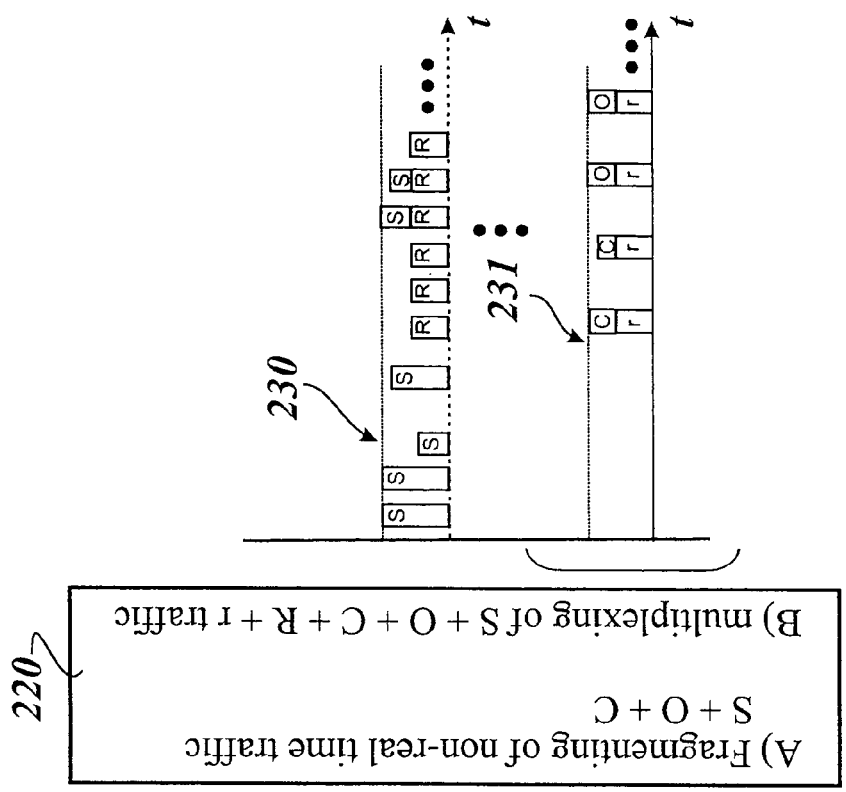
FIG. 3 is a block diagram showing a partial stage of the method according to another embodiment of the invention.
Figure 3:
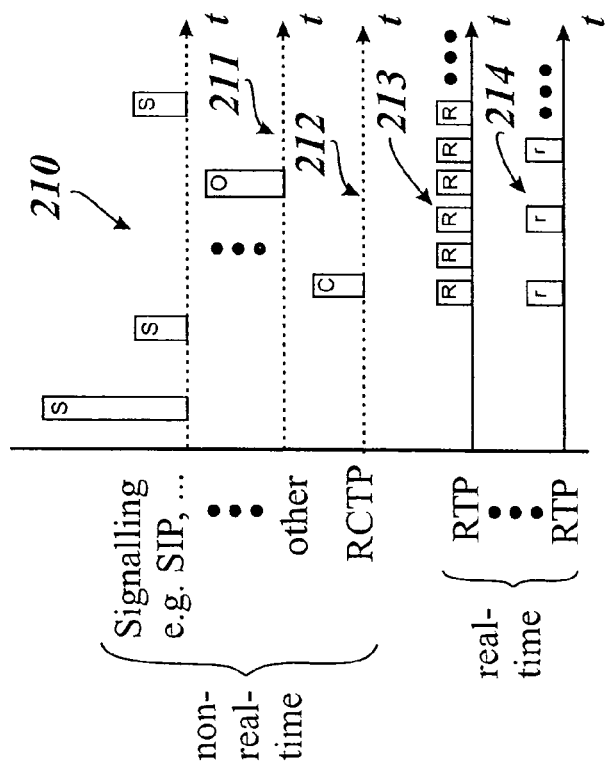

FIG. 3 illustrates details of the fragmenting and multiplexing steps 110 to 130 as described with regard to FIG. 2.

Real-time data is sent as a continuous isochronous packet. In this example, the small packets are sent as RTP packets. RTP is a protocol that is optimised in various ways for the delivery of real-time data such as live and/or interactive audio and video over IP packet-switched networks. RTP runs over UDP and uses its multiplexing and error-checking features. In accordance with the usual task of the RTP protocol, the RTP traffics 213, 214 shown in FIG. 3 comprise continuous isochronous streams of real-time packets.

The RTCP protocol provides feedback on the quality of the data distribution. RTCP is based on the periodic transmission of control packets to all participants in the session, using the same distribution mechanism as the data packets. FIG. 3 shows RTCP packets 212 and other non-real-time packets 211 associated with the RTP packet streams 213, 214.

FIG. 3 also shows SIP packets 210 as a representation of a non-real-time signalling protocol used for establishing the RTP/RTCP connection. For establishing such a RTP/RTCP connection, the signalling has to exchange information with the other end (remote terminal or network node). As long the real-time streams are not established, the SIP packets 210 can use the entire bandwidth allowed for real-time streams.

FIG. 3 shows only one direction, but normally the principle applies to both directions.

Due to the bursty nature of the signalling, control traffic and other non-real-time traffic, each data packet of the SIP traffic 210, the RTCP traffic 212 and the other non-real-time traffic 211 is different, and may be significantly greater than the typical RTP packet of RTP traffic streams 213, 214.

In a first step of the process 220, the data packets of the SIP traffic 210, the RTCP traffic 212, and the other non-real-time traffic 211 are fragmented into smaller sized packets. In a second step of the process 220, the fragmented smaller-sized SIP, RTCP and other non-real-time traffic packets are multiplexed and/or interleaved into the uniformly sized RTP packet streams 213, 214. To guarantee the real-time character of the transmitted RTP packet streams 213, 214, the RTP packets are assigned the absolute priority of transmission. Any SIP, RTCP and other non-real-time traffic packets waiting in queue for transmission are transmitted in fragments using the available space for their transmission without narrowing the bandwidth available for RTP packets. Finally, the multiplexed RTP streams 230, 231 are transmitted.

The multiplexing can be executed in different ways and using different protocols. Some examples will be presented in the following description with regard to FIGS. 4 to 9.

Figure 4:
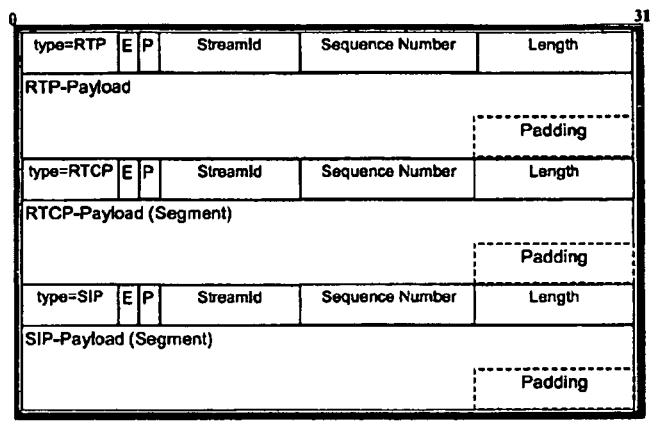
FIG. 4 is a diagram of a real-time associated multiplexed packet according to another embodiment of the invention.

In all embodiments according to the FIGS. 4 to 9, the data packets containing the real-time traffic and the non-real-time traffic are transported under the IP protocol. That is all data packets will comprise an IP header on the network level and a UDP header on the transport layer. But it is also possible that the data packets with the signalling and/or control traffic will comprise a TCP header on the transport layer FIG. 4 shows a real-time associated multiplexed packet on top of UDP. There are three packet types: real-time RTP, non-real-time RTCP, and non-real-time SIP. The type of the data packet is given in the first four octets of the packet, as well as a stream ID, a sequence number, and a length field. The remaining part of the packet contains the payload of the respective data stream. The payload may be padded with blank information, if the last fragment is not aligned with the usual 4-byte boundary.

Figure 5:
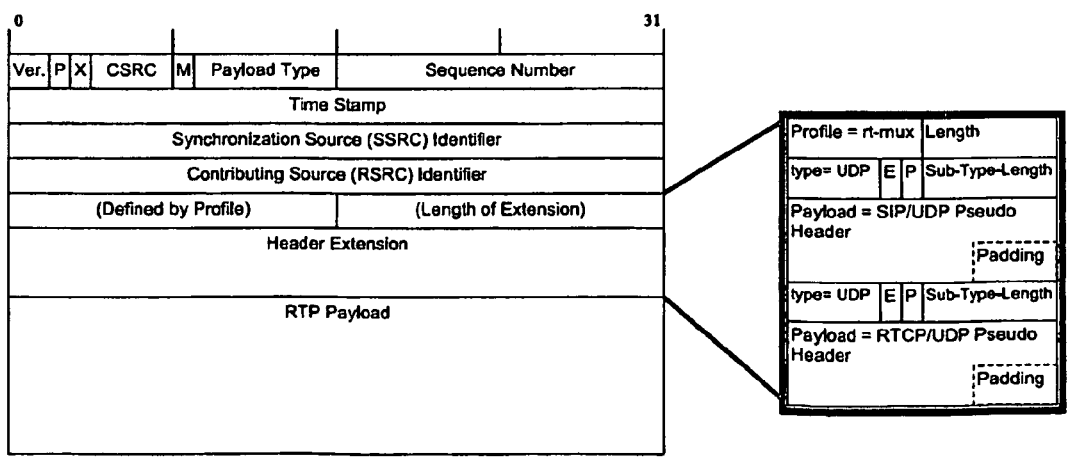
FIG. 5 is a diagram of a real-time associated multiplexed packet according to another embodiment of the invention.

FIG. 5 shows a real-time associated multiplexed packet on top of RTP. The data packet carries an RTP header. The SIP or RTCP payload are contained within the RTP header extension, which may be a UDP pseudo header.

Figure 6:
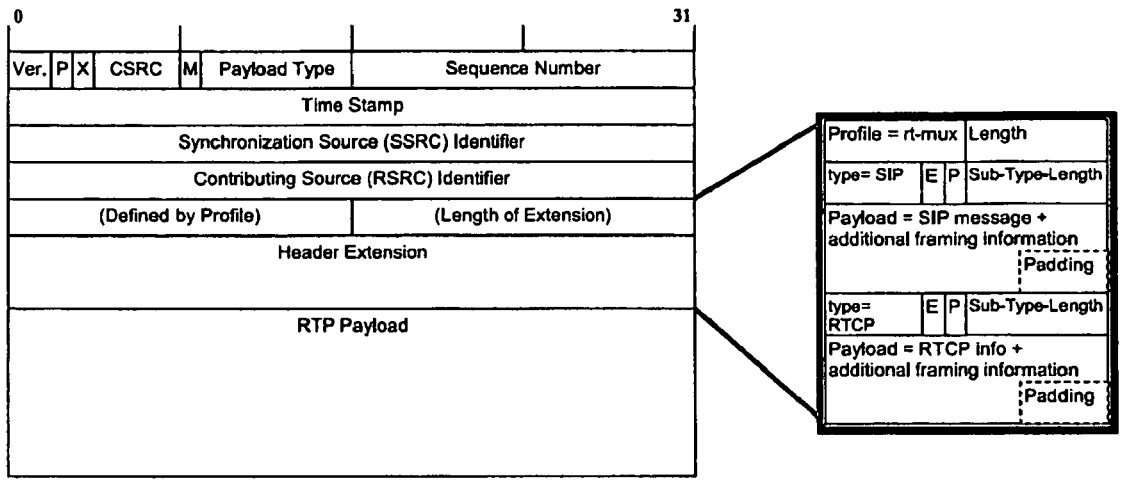
FIG. 6 is a diagram of a real-time associated multiplexed packet according to another embodiment of the invention.

FIG. 6 shows a real-time associated multiplexed packet on top of an application specific RTP protocol. The packet is similar to the packet shown in FIG. 5, except that no UDP pseudo header is used in the SIP or RTCP payload section. Instead, additional framing information such as the segment number, the total number of segments, and a checksum is contained.

Figure 7:
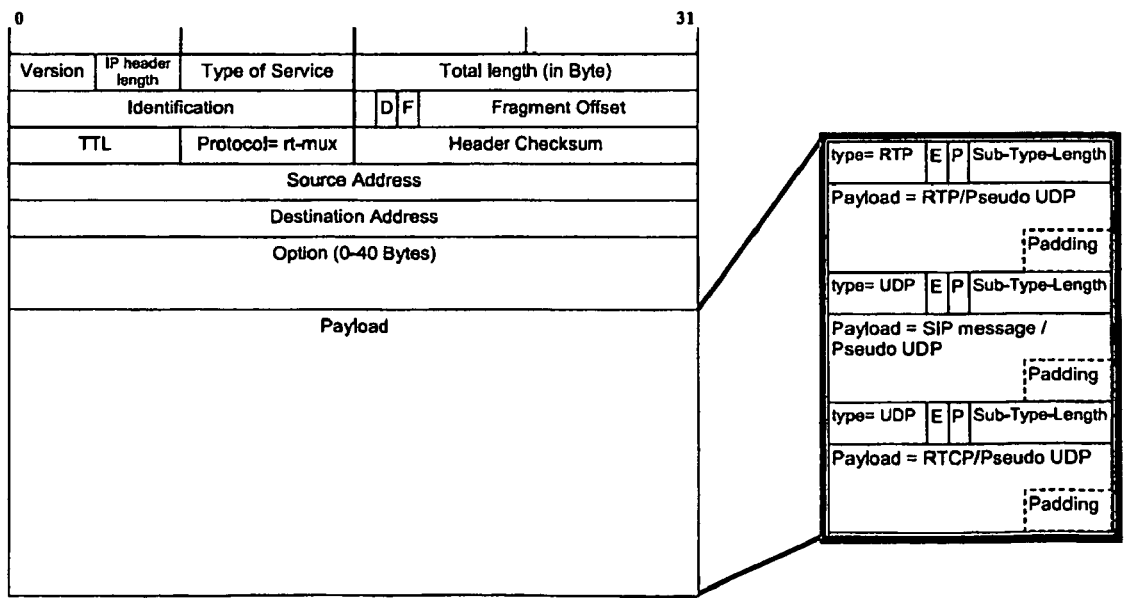
FIG. 7 is a diagram of a real-time associated multiplexed packet according to another embodiment of the invention.

FIG. 7 shows a real-time associated multiplexed packet using a new Internet protocol number. The packet carries an IP header whereby the protocol is indicated as "rt-mux", i.e., multiplexed RTP protocol. The payload section of the IP packet carries either the RTP data, the SIP message, or the RTCP data. The RTP data is formatted as RTP type, the SIP and the RTCP data are formatted as UDP type.

Figure 8:
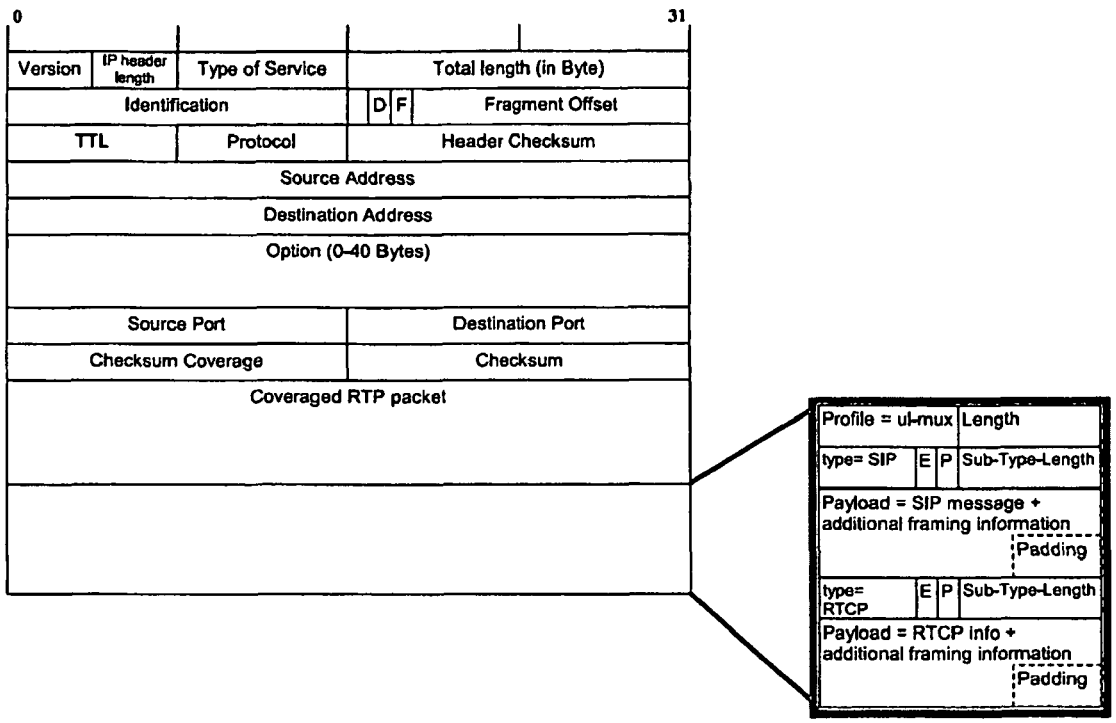
FIG. 8 is a diagram of a real-time associated multiplexed packet according to another embodiment of the invention.

FIG. 8 shows a real-time associated multiplexed packet on top of UDP-lite according to RFC 3828. The packet carries an IP header. In the option section of the IP header, a UDP lite header is inserted. Following the UDP lite header is the coveraged RTP packet, which is followed by the signalling or controlling information section. It comprises the SIP message or the RTCP information and additional framing information such as the segment number, the total number of segments, and a checksum. The information in each segment is stored under its specific type, i.e., SIP and RTCP, respectively.

Figure 9:
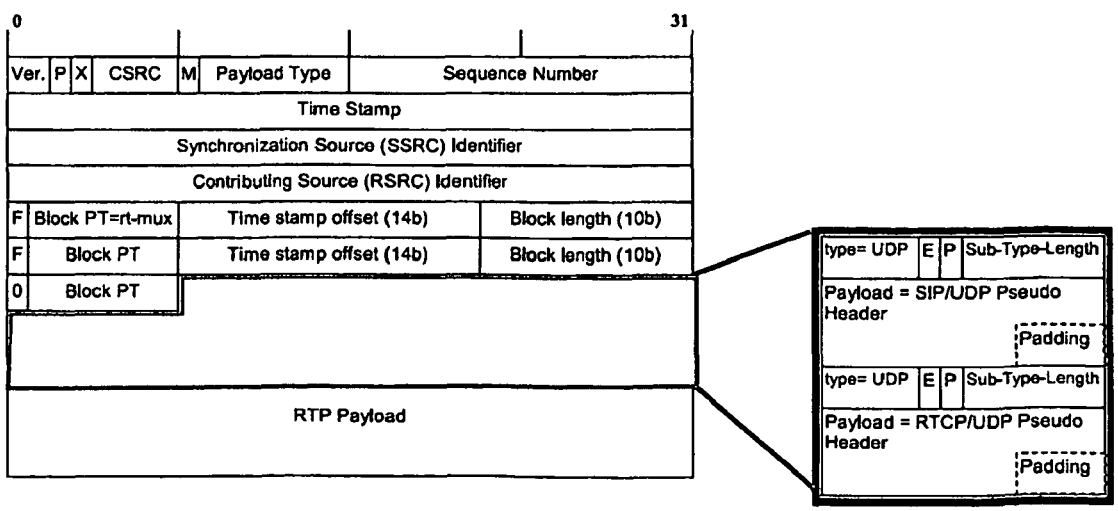
FIG. 9 is a diagram of a real-time associated multiplexed packet according to another embodiment of the invention.

FIG. 9 shows a real-time associated redundant RTP packet according to RFC 2198. To compensate for the possibility of lost packets, each RTP packet may contain redundant information in addition to, or instead of, the primary data payload. These redundant data may exactly replace lost payload data in response to a request for re-transmission. Alternatively they may represent a constant delayed secondary stream of lower-quality, lower-bandwidth data that a receiver may use as a substitute for lost primary data.

The embodiment according to FIG. 9 is similar to the one of FIG. 8, just using another payload type.

The invention claimed is:

1. A method for providing a real-time communication connection between a first entity and a second entity via an Internet Protocol communication network the method comprising:

fragmenting, by the first entity, at least one of a signaling traffic and a control traffic associated with the real-time communication connection;

multiplexing, by the first entity, at least one of the fragments of the signaling traffic and the control traffic into a real-time traffic stream of the communication connection;

generating, by the first entity, a resulting data stream including packets of the real-time traffic stream multiplexed with the fragments of at least one of the signaling traffic and the control traffic;

assigning the packets of the real-time traffic stream an absolute transmission priority;

transmitting said data stream from the first entity to the second entity via the Internet Protocol communication network, the packets of at least one of the signaling traffic and the control traffic being transmitted in fragments using an available space for transmission and without narrowing a bandwidth available for the packets of the real-time traffic stream;

demultiplexing, by the second entity, said data stream and obtaining the fragments of at least one of the signaling traffic and the control traffic and the real-time traffic stream of a communication connection at the second entity;

re-composing, by the second entity, the fragments of at least one of the signaling traffic and the control traffic; and generating, by the second entity, at least one of the signaling traffic and control traffic.

2. The method of claim 1, wherein the method comprises:

assigning, for multiplexing, to the packets of the real-time traffic stream included within said data stream a highest priority with respect to transmission via the real-time communication connection.

3. The method of claim 1, wherein the method comprises: multiplexing the fragments of at least one of the signaling traffic and the control traffic into the real-time traffic stream of the communication connection by generating separate data stream packets for at least one of the signaling traffic and the control traffic and the real-time traffic, whereby each data stream packet includes an IP header, a UDP header, application information about the type of the payload, namely one of signaling traffic, control traffic and real-time traffic, a stream ID, a sequence number, information about the length of the payload, and the payload of one of the signaling traffic, control traffic and real-time traffic.

4. The method of claim 1, wherein the method comprises: multiplexing the fragments of the at least one of the signaling traffic and the control traffic into the real-time traffic stream of the communication connection by generating separate data stream packets for at least one of the signaling traffic and the control traffic, and the real-time traffic, whereby each data stream packet comprises an IP header, a UDP header, and a RTP header, and whereby the data stream packets for at least one of the signaling traffic and the control traffic comprise a RTP header extension with an additional UDP pseudo header and with the payload of one of the signaling traffic and the control traffic.

5. The method of claim 1, wherein the method comprises: multiplexing the fragments of at least one of the signaling traffic and the control traffic into the real-time traffic stream of the communication connection by generating separate data stream packets for at least one of the signaling traffic and the control traffic, and the real-time traffic, whereby each data stream packet comprises an IP header, a UDP header, and a RTP header, and whereby the data stream packets for at least one of the signaling traffic and the control traffic include a RTP header extension with additional framing information including a segment number, a total number of segments, and a checksum, and with the payload of one of the signaling traffic and the control traffic.

6. The method of claim 1, wherein the method comprises: multiplexing the fragments of the at least one of the signaling traffic and the control traffic into the real-time traffic stream of the communication connection by generating separate data stream packets for at least one of the signaling traffic and the control traffic, and the real-time traffic, whereby each data stream packet includes an IP header with a new Internet Protocol number, and whereby the data stream packet for at least one of the signaling traffic and the control traffic includes an additional UDP pseudo header with the payload of one of the signaling traffic and the control traffic, and the data stream packet for the real-time traffic includes an additional RTP and UDP pseudo header with the payload of the real-time traffic.

7. The method of claim 1, wherein the method comprises: multiplexing the fragments of at least one of the signaling traffic and the control traffic into the real-time traffic stream of the communication connection by generating a data stream packet including an IP header, a UDP lite header, and a RTP header; and inserting one of the signaling traffic and the control traffic together with additional framing information including a segment number, a total number of segments, and a checksum, into the additional payload section of the UDP lite packet.

8. The method of claim 1, wherein the method comprises: multiplexing the fragments of at least one of the signaling traffic and the control traffic into the real-time traffic stream of the communication connection by generating a data stream packet including an IP header, a UDP header, and a RTP header according to redundant RTP; and inserting one of the signaling traffic and the control traffic together with a UDP pseudo header into the redundant section of the redundant RTP packet.

9. A sending device for providing a real-time communication connection over an Internet Protocol communication network to another entity, the sending device comprising: a control unit configured to fragment at least one of a signaling traffic and a control traffic associated with the real-time communication connection, the control unit configured to multiplex the fragments of at least one of the signaling traffic and the control traffic into a real-time traffic stream of the communication connection, the control unit configured to generate a resulting data stream including packets of the real-time traffic stream multiplexed with the fragments of at least one of the signaling traffic and the control traffic, the packets of the real-time traffic stream an absolute transmission priority, the control unit configured to send said data stream via the Internet Protocol communication network to the another entity, the packets of at least one of the signaling traffic and the control traffic being transmitted in fragments using an available space for transmission without narrowing a bandwidth available for the packets of the real-time traffic stream.

10. A receiving device for providing a real-time communication connection over an Internet Protocol communication network to another entity, the device comprising: a control unit configured to receive a data stream from the another entity via the Internet Protocol communication network, the data stream including packets of a real-time traffic stream multiplexed with fragments of at least one of a signaling traffic and a control traffic at the other entity, the packets of the real-time traffic stream being assigned an absolute priority of transmission, and packets of at least of the signaling traffic and the control traffic are transmitted in fragments using an available space for transmission without narrowing a bandwidth available for the packets of the real-time traffic stream, the control unit configured to demultiplex said data stream in order to obtain the fragments of at least one of the signaling traffic and the control traffic and the real-time traffic stream of the communication connection the control unit configured to re-compose the fragments of at least one of the signaling traffic and the control traffic and the control unit configured to generate at least one of the original signaling traffic and the control traffic.

* * * * *